May 16, 1967 W. C. KIRKPATRICK ET AL 3,320,106
FASTENING PROCESS
Original Filed Dec. 3, 1959 2 Sheets-Sheet 1
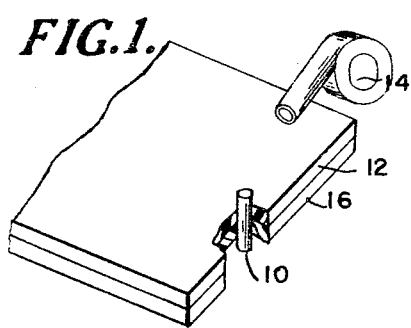
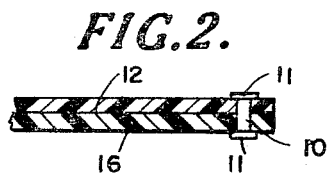
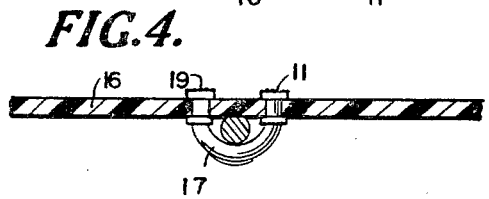
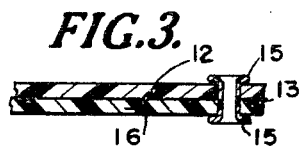
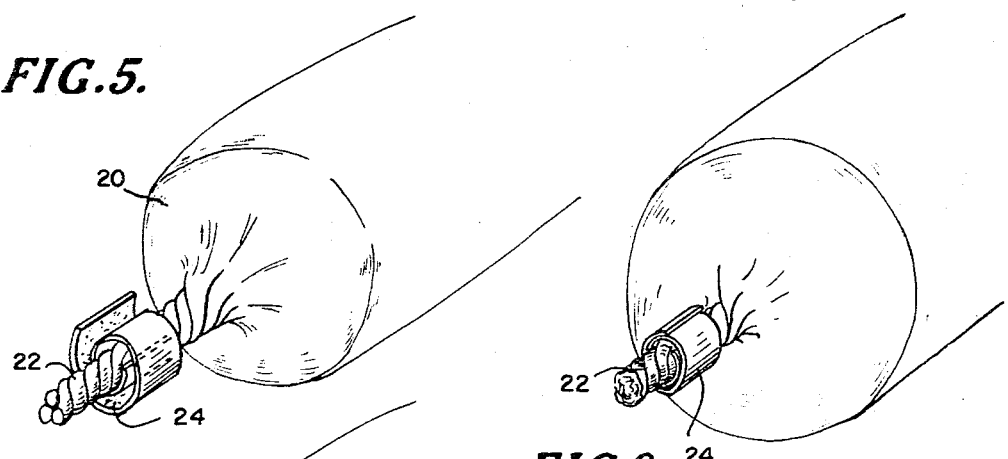
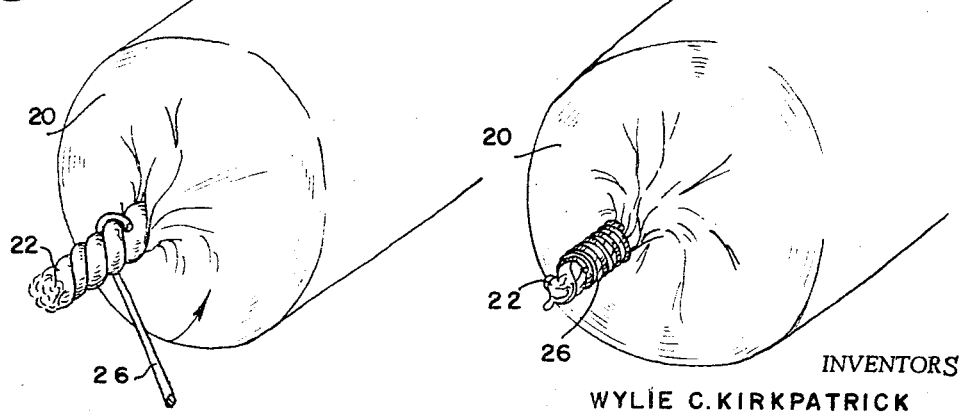
INVENTORS
WYLIE C. KIRKPATRICK
JOHN W. HARRISON
ROBERT D. LOWRY
BY C.E. Parker & J.J. Toney
ATTORNEYS

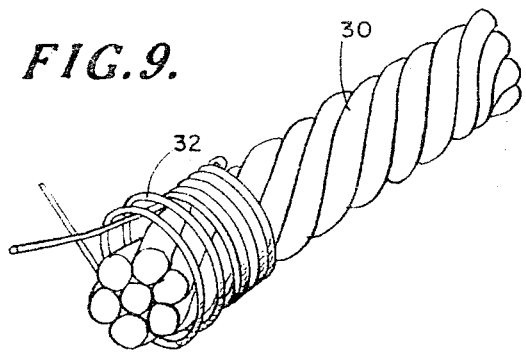
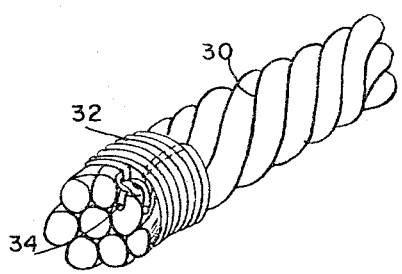
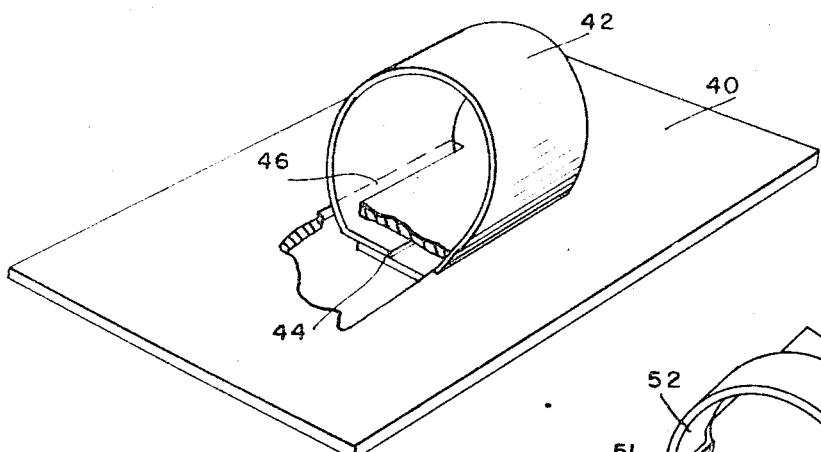
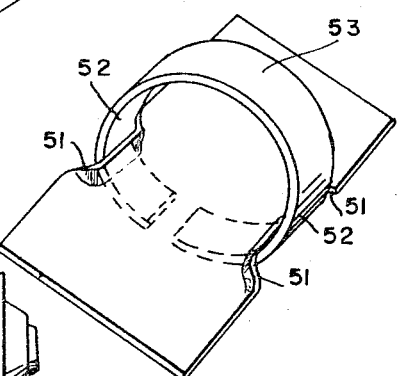
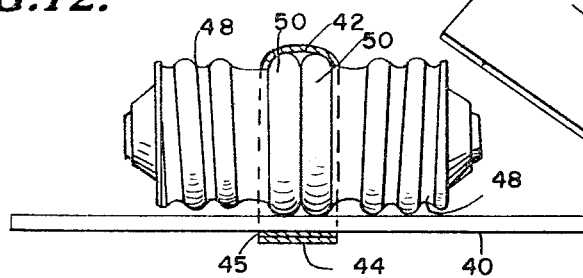
INVENTORS
WYLIE C. KIRKPATRICK
JOHN W. HARRISON
ROBERT D. LOWRY
BY C.E. Parker & J.J. Toney
ATTORNEYS 3,320,106
FASTENING PROCESS
Wylie C. Kirkpatrick, Greenwich, Conn., and John W. Harrison and Robert D. Lowry, Winchester, Mass., assignors to W. R. Grace & Co., Duncan, S.C., a corporation of Connecticut
Original application Dec. 3, 1959, Ser. No. 857,013, now Patent No. 3,113,408, dated Dec. 10, 1963. Divided and this application Sept. 13, 1963, Ser. No. 308,872
2 Claims. (Cl. 156—86)

This invention relates to a fastening member useful for binding or securing parts or articles together. More particularly this invention provides a fastening member formed of a heat shrinkable polymer such as heat shrinkable polyethylene, vinylidene chloride (saran), polypropylene or polyethylene terephthalate (Mylar). Specifically, the invention provides as a fastening member a rivet or filament for joining parts together, said member being formed of a heat shrinkable, mono-directionally oriented irradiated polyethylene polymer.

This application is a division of our prior copending application, Ser. No. 857,013, filed Dec. 3, 1959, now U.S. Patent No. 3,113,408.

By the heat shrinking process, the polymer shrinks longitudinally while concurrently expanding laterally. In a preferred embodiment of the invention, it is possible to expand a fastening member, such as a rivet from a loose internal fit to a tight secure internal fit, by utilizing a sufficient amount of the shrinkable material.

An object of this invention is to provide a new type of a fastening member that can be used in any of several modifications hereinafter described.

More particularly, an object of this invention is to provide a fastening member formed of a heat shrinkable uni-axially oriented polymer adapted to substantially shrink along its axis of orientation and expand along its other axis so that upon the application of heat the fastening member will shrink along its oriented axis and expand along its other axis.

FIGURE 1 perspectively shows a partially broken away view of a length of heat shrinkable, uni-oriented irradiated polyethylene about to be heated in place to form a rivet;

FIGURE 2 is a sectional view of the solid rivet formed and secured in place;

FIGURE 3 is a view similar to FIGURE 2 but utilizing a hollow rivet;

FIGURE 4 is yet another modification showing a length of solid rod having both ends passing through a backing material thereby forming a loop adapted to fasten articles of merchandise to the board;

FIGURES 5, 6, 7, and 8 are perspective views of a flexible closure having its ends constricted by novel fastening members made according to this invention; FIGURES 5 and 6 illustrate pressure sensitive tape as the fastening means and FIGURES 7 and 8 illustrate a mono-filament form of said polymer;

FIGURES 9 and 10 are perspective views of another adaptation comprising a rope end being whipped by a mono-filament form of said polymer;

FIGURES 11 and 12 show a display card having the articles fastened according to the novel features of this invention; FIGURE 11 being a perspective view of the fastening member in place before being heated and FIGURE 12 being a sectional view of the same display after the insertion of articles and the application of heat; and FIGURE 13 shows a modification of a display card having a band around the display article and the card.

While the invention is susceptible of assuming many forms and modifications as illustrated in the several drawings the discussion initially will relate more particularly to the fastening member shown by FIGURES 1 through 4 such as a rivet where the effect of the longitudinal shrinkage and lateral expansion leads to unique results.

Thus by utilizing the longitudinal shrink and lateral swelling or expansion ability of uni-oriented irradiated polyethylene either as a rod (FIGURE 2) or tube there can be formed a rivet. In some instances a plurality of filaments can be employed rather than just one.

The parts to be riveted 12 and 16, e.g., two pieces of wallboard, metal sheeting, glass fabric, polyvinyl resins or wooden blanks, etc., are brought together as shown in FIGURE 1 and holes are drilled through all parts where desired. The solid rod 10 cut to a predetermined length sufficient to have both ends project beyond the parts being joined is then inserted into these aligned holes and while there positioned, is subjected to heat by any suitable source indicated by blower 14. The filament rod should have a diameter only slightly smaller than the diameter of the holes. The shrinking takes place in the direction of the orientation, in the case of rivets being longitudinally, while concurrently the lateral expansion is occurring. As a consequence beads or heads 11, FIGURE 2 are formed at both ends of the rivet. These beads abut against the shoulders of the aligned holes, since the shrinking occurs on the longitudinal axis of the stem of the rivet. The stem 10, of course, expands laterally to press firmly against the internal sides of the drilled holes. In FIGURE 3 the solid rivet 10 of FIGURE 2 is replaced by hollow rivet 13 and heads 15 are formed upon heating.

Whereas FIGURES 1, 2 and 3 all show a straight filament rod 10 having its ends 11 projecting beyond the parts, 12 and 16, being joined. FIGURE 4 illustrates a modification where one of the ends is extended to a sufficient length such that it can be adapted to reenter the board through a second hole and be securely fastened in a similar way, i.e., expanded by heating as at 19. There is thus formed a loop 17 which can be subsequently shrunk by additional heat to fasten an article of merchandise, etc., to the board.

Features common to each of these modifications are the ease and inexpensiveness with which the process is carried on and the secure binding power that can thereby be attained.

The polymers best adapted for the invention are mono-directionally stretched irradiated polyethylene and mono-directionally stretched polypropylene.

The application of this principle of longitudinally shrinking and lateral expansion is equally useful as a means for fastening or securing the ends of various plastic closures or flexible bags, for example, as seen in FIGURES 5, 6, 7 and 8.

In FIGURES 5 and 6 the polymer is utilized in the form of conventional pressure sensitive tape 24 and in FIGURES 7 and 8 as mono-filament 26 adapted to be wrapped about the gathered end 22. Both modifications depend for the constricting means on the high shrink energy released by the uni-axially irradiated polyethylene polymer at shrink temperatures. The open end of bag 20 can be gathered to form a closure or optionally twisted as at 22 and then wrapped with the polymer and heat shrunk with the result that the closure becomes a good moisture and/or gas barrier. In place of a bag a tube can be employed and both ends closed in the manner indicated.

The end of an inflated bag 20 was twisted 22 as though for the conventional application of a clip.

About said twisted portion there are wrapped about three moderately tightly applied turns of pressurized sensitive tape. The tape can easily be made by knife coating mono-directionally oriented irradiated polyethylene film about 3 mils thick with pressure sensitive silicone adhesive (a polydimethyl silicone).

In place of the tape, a monofilament can be substituted with even better results. FIGURES 7 and 8 illustrate the use of such a filament. The bag 20 has been filled and its ends twisted 22 in a manner exactly as in FIGURES 5 and 6. About 10 turns of a monofilament 26 are applied as though whipping rope. A knot should be tied in order for the monofilament to exert a force on the closure when shrunk.

Subsequenly upon heating to about 205° F. the polymer shrinks longitudinally and expands laterally whereby the closure when tested by squeezing the inflated portion is found to be very adequately sealed.

FIGURES 9 and 10 illustrate another application of this invention. The high shrink energy of a monofilament as depicted in FIGURES 7 and 8 is used to form an unusually tight anti-fraying binding on the end of a rope. The monofilament is applied using the common technique for whipping wherein the ends are locked under the wrapping. A similar process called serving in which a long segment of rope is similarly bound, with or without previous "worming" and "parceling" can also be employed.

Specifically, the rope end 30 is whipped and the whipping subsequently heat shrunk, using a monofilament of irradiated polyethylene 32 which had been mechanically elongated by stretching.

Another novel feature of this application is that the filament ends can be tied outside the wrapping, and by applying heat so that the loose ends from the knot shrink first, the knot 34 will not subsequently untie as is common in plastic yarns.

A means of affixing merchandise to display cards is illustrated in FIGURES 11 and 12, in which a tape loop 42 is preaffixed to the card and made large enough for easy insertion of the merchandise and is subsequently shrunk to tightly lock the merchandise to the card. Obviously this method can be used to fasten either single or multiple articles to the card in a similar manner. An instance of at least two articles is illustrated in FIGURE 12. Two fuses 48 are there shown being held in a place by a film longitudinally shrunken 42 about the base bead 50 of each fuse.

In detail, a display card such as a blank of cardboard 40, is perforated with two parallel slots 46 to permit the ends 44, 45, of a loop of tape 42 to enter and be fastened in the underside by a convenient means, such as a strip of pressure sensitive tape or a staple (not shown). The loop 42 was left sufficiently large for easy insertion of the merchandise to be displayed as in the case of FIGURE 12, two household fuses 48.

The tape 42 had to be wide enough to overlap the bead edges 50 of the base of the two fuses so that after the application of heat the band drew down and conformed to the bead shape, tightening the fuses to the card, and locking them in place by reason of the form fit over the beads.

The tape used can, of course, be fastened to the card in alternate ways such as by stapes, heat sealing, adhesives, etc., or can be a band around both the object displayed and the card. In FIGURE 13 a band is used around both the object displayed and the card. A pair of notches 51 are made in opposite edges of the card and the portions 52 between the notches are folded at right angles to the card face. This results in a strengthening of the card and provides a recess to hold the band 53 in place.

The uni-axial stretching or orientation can be accomplished in any manner known to the art, e.g., as shown in Rainer Patent 2,877,500. By uni-axial orientation, the molecules are assembled in columns facing in the direction of stretch, e.g., lateral or longitudinal.

The degree of stretching should be sufficient to provide the minimum constrictive force necessary for any given application to which it is to be put. For example, it can be heated and stretched 100%, 175%, 200%, 300%, or 500% or 900% or even more. The irradiation can be to a dosage of 2 to 100 megarad, preferably 6 to 20 megarad. In the examples there was employed Alathon 14 (polyethylene) irradiated at a dosage of 12 megarads with high energy electrons.

As a matter of fact, the transparent polyethylene derived by that process including the uni-axial stretching step provided thereby has been found of excellent quality when used in this invention.

The desirability of having the polymer being transparent will vary with the applications described herein as well as other applications suggested thereby. This characteristic of the polymer, however, is incidental to the capability of shrinking longitudinally and expanding laterally.

It is to be understood that while several illustrations of the novel fastening member have been described, this application is expressly intended to cover all modifications and changes which come within the spirit of this invention and the scope of the appended claims.

What we claim is:

1. A method of fastening an object to a backing member comprising providing at least two apertures in said backing member, inserting the ends of an elongated heat shrinkable polymeric member through said apertures to form a U-shaped member, an object being positioned between said U-shaped member and said backing member, and applying heat to the end portions extending through said apertures to form integral beads adjacent opposite sides of the backing member to cooperatively exert compressive force thereon thereby securing the U-shaped member to the backing member.

2. The method of claim 1 wherein said U-shaped member extending over the object is subsequently subjected to sufficient heat to heat shrink said U-shaped member about said object.

References Cited by the Examiner

UNITED STATES PATENTS

| 2,453,991 | 11/1948 | Kaemmerling | 85—82 X |
| 2,458,152 | 1/1949 | Eakins. | |
| 2,510,693 | 6/1950 | Green. | |
| 2,759,390 | 8/1956 | Edwards. | |
| 2,956,468 | 10/1960 | Macy | 85—72 |
| 2,994,933 | 8/1961 | Wolfe | 85—82 X |
| 3,022,543 | 2/1962 | Baird et al. | |
| 3,093,448 | 6/1963 | Kirkpatrick et al. | |

FOREIGN PATENTS

| 206,765 | 6/1955 | Australia. |

ALEXANDER WYMAN, *Primary Examiner.*

JACOB STEINBERT, *Examiner.*

W. POWELL, *Assistant Examiner.*